United States Patent [19]
Svensson

[11] Patent Number: 5,732,335
[45] Date of Patent: Mar. 24, 1998

[54] EXTERNALLY CONTROLLED OUTPUT POWER BY MEANS OF ANTENNA KEYING

[75] Inventor: Jan Svensson, Lund, Sweden

[73] Assignee: Telefonaktiebolaget LM Ericsson, Stockholm, Sweden

[21] Appl. No.: 430,829

[22] Filed: Apr. 28, 1995

[51] Int. Cl.$^6$ ..................................................... H04Q 7/32
[52] U.S. Cl. .................... 455/127; 455/571; 455/572; 455/129
[58] Field of Search ................ 455/89, 127, 129, 455/53.1, 101, 97, 99, 571, 572

[56] References Cited

U.S. PATENT DOCUMENTS

| | | | |
|---|---|---|---|
| 4,636,741 | 1/1987 | Mitzlaff | 455/127 X |
| 4,654,882 | 3/1987 | Ikeda | 455/88 |
| 4,803,447 | 2/1989 | Schultz et al. | 455/129 X |
| 5,048,117 | 9/1991 | Aisaka et al. | 455/89 |
| 5,054,115 | 10/1991 | Sawa et al. | 455/89 |
| 5,095,541 | 3/1992 | Aisaka et al. | 455/89 |
| 5,101,507 | 3/1992 | Jung | 455/127 |
| 5,193,219 | 3/1993 | Tamura | 455/89 |
| 5,261,121 | 11/1993 | Hashimoto | 455/89 |
| 5,276,912 | 1/1994 | Siwiak et al. | 455/127 X |
| 5,276,918 | 1/1994 | Cornforth et al. | 455/89 |
| 5,303,395 | 4/1994 | Dayani | 455/127 |
| 5,369,803 | 11/1994 | Hirasawa et al. | 455/89 |

FOREIGN PATENT DOCUMENTS

| | | |
|---|---|---|
| 331 435 | 9/1989 | European Pat. Off. . |
| WO93/01659 | 1/1993 | WIPO . |

OTHER PUBLICATIONS

European Telecommunication Standard, European Digital Cellular telecommunications System (Phase 2); Types of Mobile Stations (MS), GSM 02.06, May 1994, pp. 1–10.
Robert Ford et al., "Method for Automatic RF Switching Based on Presence of Antenna", *Motorola Technical Developments*, vol. 19, pp. 25–26, Jun. 1993.

*Primary Examiner*—Chi H. Pham
*Attorney, Agent, or Firm*—Burns, Doane, Swecker & Mathis, L.L.P.

[57] ABSTRACT

A system and method are provided for controlling the output power from a mobile station based on the type of antenna used. The system and method detects whether the antenna is a type which is directly attached to an acoustic transducer for speech of the mobile station and controls the output transmission power based on this detection to conform with GSM requirements. More particularly, if the antenna is detected to be directly attached to the acoustic transducer for speech, and thereby to the hand set of the mobile station, the maximum output power of the mobile station is Class 4 or 5, which corresponds to 2.0 watts or 0.8 watts respectively, in order to comply with the GSM requirements. However, if the antenna of the mobile station is not detected to be directly attached to the acoustic transducer for speech, a higher maximum output power of the mobile station of Class 2 or 3, which corresponds to 5.0 watts or 8.0 watts respectively, is used by determining that an externally connected antenna is being used by the mobile station. As a result, the system and method controls the output power of the mobile station to conform with the GSM requirements for the output power at a high accuracy.

23 Claims, 2 Drawing Sheets

, 335

EXTERNALLY CONTROLLED OUTPUT POWER BY MEANS OF ANTENNA KEYING

BACKGROUND

The present invention is directed to a method and system of controlling the output power from a mobile station based on the type of antenna used. More particularly, the method and system controls the output power in response to detecting whether the antenna is directly attached to an acoustic transducer for speech of the mobile station or whether the antenna is externally connected to the mobile station so that the output power of the mobile station conforms with GSM requirements.

It is desired to control the output power from a GSM terminal to conform with the GSM 02.06 requirements for a hand-held mobile station. The portions of GSM 02.06 directed to the output power requirements are included in sections 3.3–5, which are hereby incorporated by reference.

The GSM 02.06 requirements define a hand-held mobile station as "the station where the antenna can be directly attached to a portion of the equipment containing an acoustic transducer for speech." As defined in section 5 of the GSM 02.06 requirements, such hand-held mobile stations are only allowed to transmit at Class 4 or 5 which corresponds to a maximum output power of 2.0 W or 0.8 W.

However, a hand-held mobile station may be configured as a vehicle-mounted or portable station where the antenna is externally connected to the system and is not directly attached to a portion of the equipment containing the acoustic transducer for speech. In these stations with an externally connected antenna, the mobile station is allowed to transmit in any mobile station class such as Class 2 or 3 having a maximum output power of 5.0 W or 8.0 W for example. Even though a mobile station can transmit at any power level when an external antenna is used, an output power of Class 2 or 3 is used to increase the chance of getting in contact with the cellular system. For instance, if the distance between radio base stations is large or if the mobile station user is inside a car or a building, there is actually no need for extra power because an external antenna can get "outside."

The present solution for controlling the output power a GSM terminal is either by using a man-made interface or by detecting the existence of an external power source. The man-made interface requires the user to recognize the necessary output power for conforming to GSM requirements and then to manually control an output power switch to properly control the output power. This system is very dependent upon the user and the output power will not be controlled properly if the user forgets to switch the output power or if the user is not knowledgeable of the output power requirements for conforming with the GSM requirements.

Another known system detects whether an external power source is present and switches the output power according to this detection. One example of this known system determines whether an external power source, such as a 12 volt car battery, supplies power to the mobile station and if such an external source is detected, it is assumed that an externally connected antenna is connected to the mobile station and the output power for transmitting is set to Class 2 or 3 which corresponds to 5.0 W or 8.0 W, respectively. This system only detects whether an external power source is present and does not specifically detect whether an antenna is directly attached to the mobile station at the acoustic transducer for speech. As a result, if an external power source fails to be detected, the output power from the GSM terminal will be lowered for transmitting at Class 4 or 5 (2.0 W or 0.8 W maximum output power). Thereby, a detection on whether the antenna is directly attached to the acoustic transducer for speech may not be accurately determined so that compliance is not made with the GSM requirements.

By failing to accurately control the output power during transmission from the GSM terminal and not conforming to the GSM requirements, many adverse conditions arise when using the mobile station. For example, if the output power from the mobile station does not conform to the GSM requirements, a hand-held mobile station may transmit at a high maximum output power. Because the power source of the hand-held mobile station is used in close proximity to the user when transmitting, it is desired to reduce the maximum output power as much as possible when transmitting due to the potential dangers to users from high output power. Also, if the output power from the mobile station does not conform to the GSM requirements, the probability of accessing external networks from the mobile station will decrease when a high output power is used to transmit from a confined area, such as a car for example, due to the electromagnetic properties of the transmitted radio waves. Furthermore, if a high output power is used by a hand-held mobile station inside of a car, the operation of the electronic control systems of the car may be adversely affected by high power radio transmission. Accordingly, a system and method which prevents the problems in known systems is desired so that the output power from a GSM terminal automatically and accurately conforms with GSM requirements.

SUMMARY

An object of the present invention is to provide a method and system of controlling the output power from a GSM terminal to conform with GSM requirements.

Another object of the present invention is to provide a method and system of controlling the output power from a mobile station by detecting whether an antenna of the mobile station is directly attached to an acoustic transducer for speech of the mobile station and then controlling the output power of the mobile station transmission based on this detection.

A still further object of the present invention is to detect the type of antenna that is used by the mobile station and controlling the output power for transmission between first and second output power levels based on this detection.

These objects of the present invention are fulfilled by providing a method of controlling the output power from a mobile station comprising the steps of detecting whether the antenna of the mobile station is directly attached to an acoustic transducer for speech of the mobile station and controlling the output power of the mobile station to transmit at a first maximum output power in response to the step of detecting. This method controls the output power from the mobile station to conform with the GSM requirements for output power transmission at a high accuracy. More particularly, this method transmits at a maximum output power of Class 4 or 5, which corresponds to 2.0 W or 0.8 W respectively, when the antenna is directly attached to the acoustic transducer for speech of the mobile station and at a maximum output power of Class 2 or 3, which corresponds to 5.0 W or 8.0 W respectively, when the antenna is externally connected to the mobile station.

The objects of the present invention are also fulfilled by providing a system for controlling output power from a mobile station comprising an antenna for the mobile station, a detector for detecting whether said antenna is directly attached to an acoustic transducer for speech, and a controller for controlling the output power of the mobile station to transmit at a first maximum output power in response to said acoustic transducer for speech being detected as directly attached to said antenna by said detector. This system also allows the output power from the mobile station to be controlled with high accuracy in order to conform with the GSM requirements.

Further scope of applicability of the present invention will become apparent from the detailed description given hereinafter. Although, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, wherein.

DESCRIPTION

Figure 1:
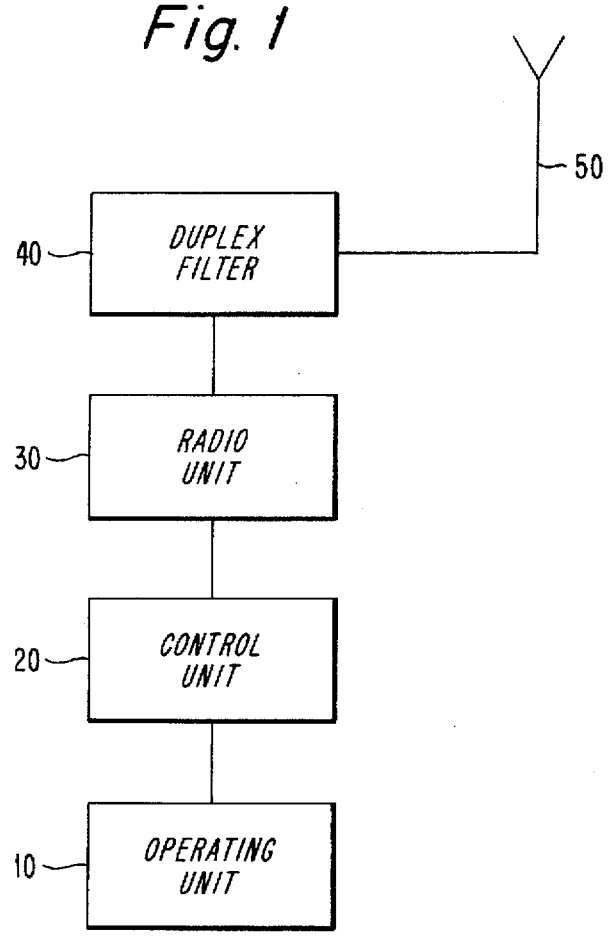
FIG. 1 illustrates a mobile station for an embodiment of the present invention.

An embodiment of the present invention will be discussed with respect to FIG. 1. FIG. 1 illustrates a block diagram of the main functional units in a mobile station. These functional units include an operating unit 10, a control unit 20, a radio unit 30, a duplex filter 40 and an antenna 50. The operating unit 10 is controlled by a microprocessor and is generally incorporated in the hand set of the mobile station which includes an acoustic transducer for speech. The operating unit 10 includes at least features such as keypads and a display. The mobile station also includes a control unit 20 based on a microprocessor. If a handset is provided separate from the mobile station, two microprocessors must be used for the operating unit 10 and the control unit 20. However, if the handset is incorporated in the mobile station as one unit, a single microprocessor can be used for the operating unit 10 and the control unit 20.

Figure 2:
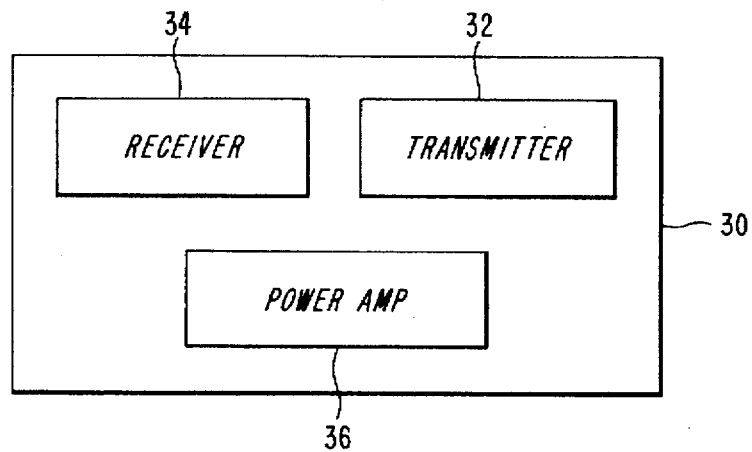
FIG. 2 illustrates a more detailed illustration of the radio unit for the mobile station illustrated in FIG. 1.

The control unit 20 handles data signalling on the radio path according to known protocols and also controls the radio unit 30. The radio unit 30 performs the radio communication from the mobile station to other stations such as radio base stations for example. The main operating functions performed by the radio unit 30 are illustrated in FIG. 2 and include a transmitter 32, a receiver 34 and a power amplifier 36. The mobile station also includes a duplex filter 40 that is connected to an antenna 50 and the duplex filter 40 allows for simultaneous transmission and reception by the antenna 50 on the radio path.

In order to conform to the GSM requirements for the output power, the control unit 20 controls the output power from the radio unit 30 based on the type of antenna detected. The detection of the type of antenna can be performed in various conventional ways. For example, mechanical, inductive, magnetic, etc. detection can be used. Also, the control unit 20 detects whether the antenna 50 is directly connected to the hand set of the mobile station or whether the antenna 50 is externally connected to the mobile station. If a hand-held mobile station is determined to have the operating unit 10, the control unit 20, the radio unit 30 and the duplex filter 40 incorporated into a hand set and the antenna 50 is attached to this hand set so that the portion of the mobile station containing the acoustic transducer for speech is directly attached to the antenna 50, the hand-held mobile station is only allowed to transmit at a first maximum output power.

To comply with the GSM requirements for output power, this first maximum output power for transmission is of Class 4 or 5, which corresponds to 2.0 W or 0.8 W maximum output power. However, if the mobile station is configured as a vehicle mounted or a portable mobile station, the control unit 20 determines this condition and allows transmission in any mobile station class. When complying with GSM requirements, the mobile station is allowed to transmit at Class 2 or 3, which corresponds to 5.0 W or 8.0 W maximum output power.

Figure 3:
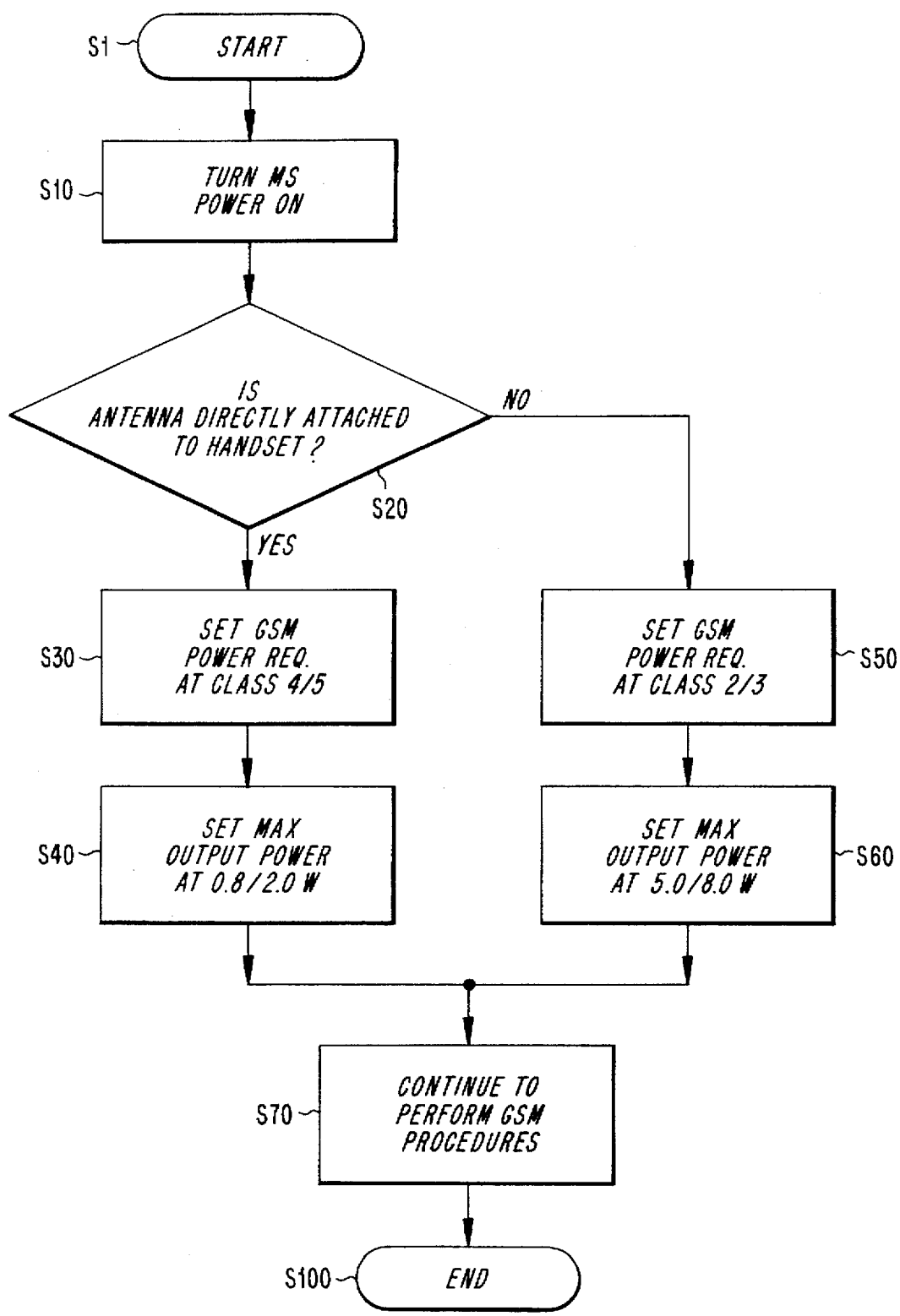
FIG. 3 illustrates a flow chart for the output power control in an embodiment of the present invention.

FIG. 3 illustrates a flow chart for the control of the output power of a GSM terminal that conforms to the GSM requirements for the output power. At step S10, the power for the mobile station is turned on. Next, step S20 determines whether or not the antenna 50 is directly attached to the hand set and thereby to the acoustic transducer for speech. If the antenna 50 is determined to be directly attached to the hand set, the operation proceeds to step S30 where the GSM power requirements are set to Class 4 or 5 and then to step S40 which sets the maximum output power from the radio unit at 0.8 W or 2.0 W. However, if the antenna 50 fails to be determined as directly attached to the hand set at step S20, the operation proceeds to step S50 where the GSM power requirements are set at Class 2 or 3 and then to step S60 where the maximum output power from the radio unit is set at 5.0 W or 8.0 W. After setting the maximum output power at either step S40 or S60, the operation proceeds to step S70 where process continues and the known GSM procedures are performed.

The embodiments are directed to detecting whether the antenna is directly connected to the acoustic transducer for speech of the hand set because this is the critical issue in determining the maximum allowed output power for transmission by the mobile station. As a result, the output power is controlled by detecting the type of antenna that is used by the mobile station in order to conform with the GSM requirements for the output power. If a first type of antenna, such as an external antenna type, is used, then the mobile station is allowed to transmit at one maximum output power, such as Class 2 or 3 corresponding to 5.0 W or 8.0 W, in order to conform with the GSM requirements for the output power. If a second type of antenna is used, such as a type of antenna directly connected to the acoustic transducer of the hand set, the mobile station is allowed to transmit with another lower maximum output power, such as Class 4 or 5 corresponding to a maximum output power of 2 W or 0.8 W for example, in order to conform with the GSM requirements for the output power. Thereby, the output power from the GSM terminal is controlled with a high degree of accuracy to conform with the GSM requirements.

The invention being thus described, it will obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of controlling the output power from a mobile station, comprising the steps of:

(a) determining whether the mobile station is attached to an antenna by a first type of connection or a second type of connection; and (b) controlling the output power of the mobile station such that when the mobile station is connected by the first type of connection, the output power is at a first level, and when the mobile station is connected by the second type of connection, the output power is at a second level, wherein a power source internal to the mobile station supplies substantially all of the output power at each level.

2. A method according to claim 1, wherein the first type of connection is when the antenna is directly attached to at acoustic transducer for speech contained in the mobile station, and the second type of connection is when the antenna is not directly attached to the acoustic transducer for speech.

3. A method according to claim 2, wherein the first power level complies with GSM Class 4 or 5, which corresponds to 2.0 watts or 0.8 watts, respectively, and the second power level complies with GSM Class 2 or 3, which corresponds to 5.0 watts or 8.0 watts, respectively.

4. A method according to claim 1, wherein the first type of connection is when the antenna is not externally connected to the mobile station and the second type of connection is when the antenna is externally connected to the mobile station.

5. A method according to claim 4, wherein the first power level complies with GSM Class 2 or 3, which corresponds to 5.0 watts or 8.0 watts, respectively, and the second power level complies with GSM Class 4 or 5, which corresponds to 2.0 watts or 0.8 watts, respectively.

6. A method of controlling output power from a mobile station comprising the steps of:

(a) detecting between first and second types of antennas; and (b) controlling the output power of the mobile station to transmit at a first maximum output power when said first type of antenna is detected and at a second maximum output power when said second type of antenna is detected, wherein a source internal to the mobile station provides substantially all of the first and second maximum output power.

7. A method according to claim 6, wherein the first type of antenna is directly connected to the mobile station at an acoustic transducer for speech and the second type of antenna is externally connected to the mobile station.

8. A method according to claim 7, wherein said first maximum output power is GSM Class 4 or 5, which corresponds to 2.0 watts or 0.8 watts respectively, and said second maximum output power is GSM Class 2 or 3, which corresponds to 5.0 watts or 8.0 watts, respectively.

9. A method according to claim 6, wherein the first type of antenna is directly attached to the hand set of the mobile station and the second type of antenna is external to the hand set of the mobile station.

10. A system for controlling output power from a mobile station, comprising:

a power source internal to the mobile station;

an antenna for the mobile station;

a detector for detecting whether the antenna is a first type or a second type; and a controller for controlling the output power of the mobile station to transmit at a first maximum output power when the detector detects the first type of antenna and at a second maximum output power when the detector detects the second type of antenna, wherein the power source provides substantially all of the output power.

11. A system according to claim 10, wherein the first type of antenna is directly connected to the mobile station at an acoustic transducer for speech and the second type of antenna is externally connected to the mobile station.

12. A system according to claim 11, wherein the first maximum output power is GSM Class 4 or 5, which corresponds to 2.0 watts or 0.8 watts, respectively, and the second maximum output power is GSM Class 2 or 3, which corresponds to 5.0 watts or 8.0 watts, respectively.

13. A system according to claim 10, further comprising:

an operating for including keypads, a display and an acoustic transducer for speech;

a radio unit including a transmitter and a receiver; and a duplex filter connected to the antenna for simultaneously transmitting and receiving via the antenna on a radio path.

14. A system according to claim 13, wherein the detector, controller, operating unit, radio unit and duplex filter are incorporated into a hand set of the mobile station and the first type of antenna is directly connected to the acoustic transducer.

15. A system according to claim 14, wherein the second type of antenna is external to the hand set and is used in a vehicle mounted or portable configuration of the mobile station.

16. A system for controlling output power from a mobile station, comprising:

an antenna for the mobile station;

a detector for detecting whether the antenna is directly attached to the mobile station or whether the antenna is externally connected to the mobile station; and a controller for controlling the output power of the mobile station in response to the detector, substantially all of the output power of the mobile station being supplied by a source internal to the mobile station.

17. A system according to claim 16, wherein the controller controls the output power to transmit at a first maximum output power if the antenna is directly attached to the mobile station and at a second maximum output power if the antenna is not directly attached to the mobile station.

18. A system according to claim 16, wherein the first maximum output power complies with GSM Class 4 or 5, which corresponds to 2.0 watts or 0.8 watts, respectively, and the second maximum output power complies with GSM Class 2 or 3, which corresponds to 5.0 watts or 8.0 watts, respectively.

19. A system according to claim 16, wherein the controller controls the output power to transmit at a first maximum output power if the antenna is externally connected to the mobile station and at a second maximum output power if the antenna is not externally connected to the mobile station.

20. A system according to claim 19, wherein the first maximum output power complies with GSM Class 2 or 3 which corresponds to 5.0 watts or 8.0 watts, respectively, and the second maximum output power complies with GSM Class 4 or 5, which corresponds to 2.0 watts or 0.8 watts, respectively.

21. A system according to claim 16, further comprising:

an operating unit including keypads, a display and an acoustic transducer for speech;

a radio unit including a transmitter and receiver; and a duplex filter connected to the antenna for simultaneously transmitting and receiving via the antenna on a radio path.

22. A system according to claim 21, wherein the detector, controller, operating unit, radio unit and duplex filter are incorporated into a handset of the mobile station so that the antenna is directly attached to the acoustic transducer for speech via the hand set.

23. A system according to claim 21, wherein a second maximum output power corresponds to the antenna being externally connected to the mobile station for use in a vehicle mounted or portable configuration of the mobile station.

* * * * *